United States Patent [19]
Johnson, Jr.

[11] Patent Number: 5,632,514
[45] Date of Patent: May 27, 1997

[54] JUVENILE SAFETY GATE LATCH FOR SWING GATE

[76] Inventor: Marvin B. Johnson, Jr., 42 B Werz Industrial Dr., Newnan, Ga. 32063

[21] Appl. No.: 621,623

[22] Filed: Mar. 26, 1996

[51] Int. Cl.$^6$ ........................................... F05C 19/10
[52] U.S. Cl. .................. 292/95; 49/465; 49/463; 49/55
[58] Field of Search ............... 292/95, 116, 262; 49/463, 465, 50, 55, 57

[56] References Cited

U.S. PATENT DOCUMENTS

| | | | |
|---|---|---|---|
| 3,704,563 | 12/1972 | Waller | 49/463 |
| 4,702,036 | 10/1987 | Johnson | 49/55 |
| 5,060,421 | 10/1991 | Castelli | 49/463 |
| 5,272,840 | 12/1993 | Knoedler et al. | 49/463 |
| 5,367,829 | 11/1994 | Crossley et al. | 49/57 X |
| 5,437,115 | 8/1995 | Freese et al. | 49/57 X |
| 5,457,914 | 10/1995 | Johnson, Jr. | 49/463 |

*Primary Examiner*—Rodney M. Lindsey
*Assistant Examiner*—Monica E. Millner
*Attorney, Agent, or Firm*—J. Gibson Semmes

[57] ABSTRACT

The invention encompasses a juvenile safety gate latch and housing which is handily mobile, its function being to render the existing gate secured, for intermittent passage of an adult through a gateway. It is especially useful for swinging such a gate from its open to closed position, and vice versa. It has specific utility for gates which are extendible and retractable. In their extended, closed position they compress against walls of a passageway for fixation against dislodging forces. The latch housing may be mounted upon a door stop or balustrade separately from the gate, but it is ideally portable with the gate from one passageway to another. It is characterized by its portability and versatile mounting without the use of any screws or other fixing devices. Once mounted it permits the adult to open and close the gate with one hand.

4 Claims, 4 Drawing Sheets

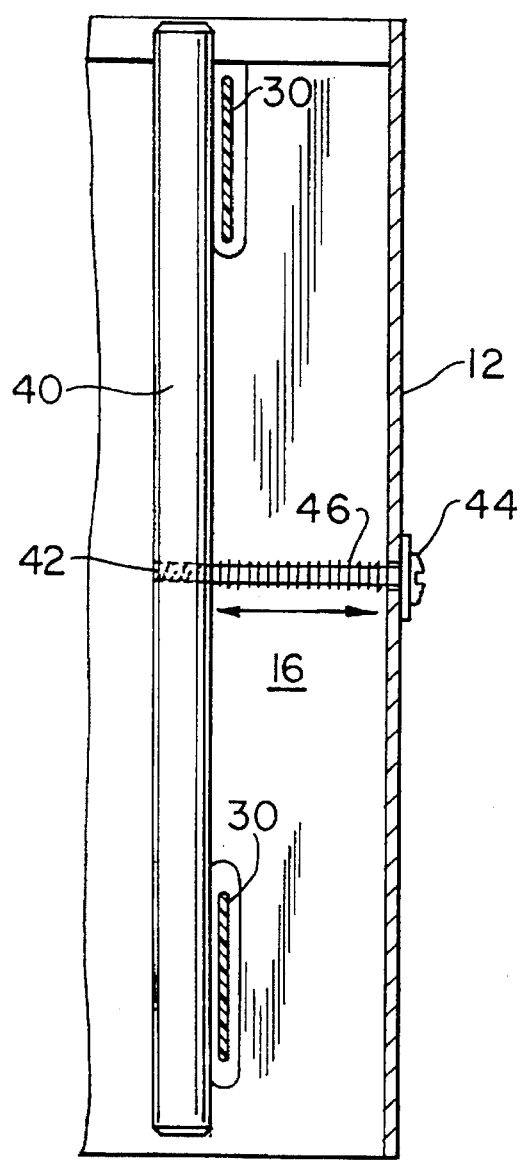
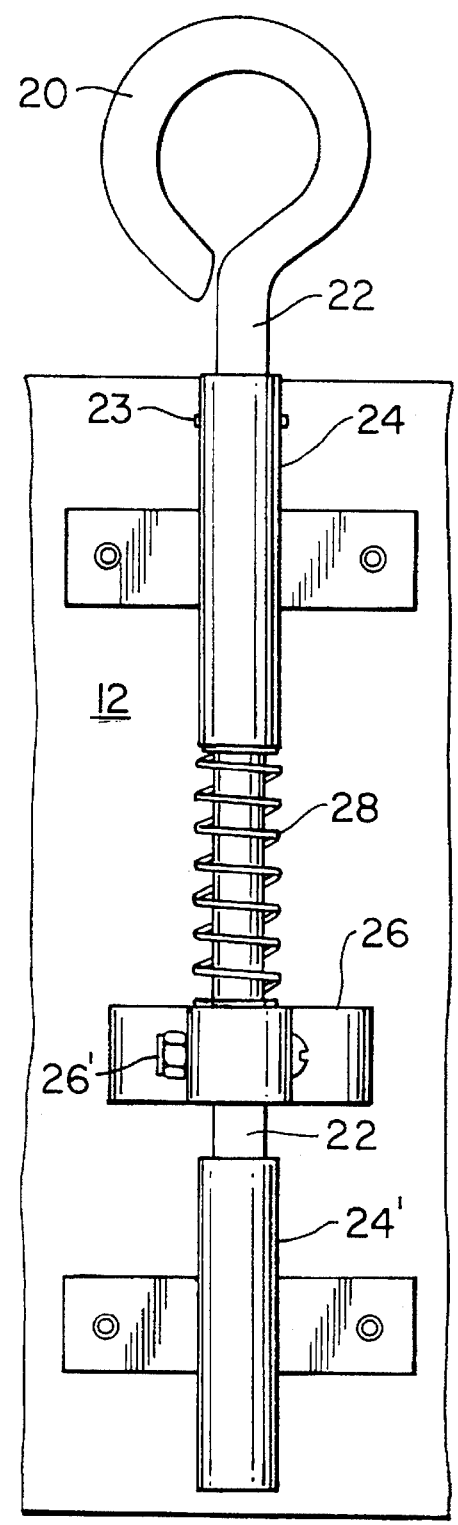
FIG. 4
FIG. 5

JUVENILE SAFETY GATE LATCH FOR SWING GATE

BACKGROUND OF THE INVENTION

Safety gates for children of toddler age are characteristically extensible and retractable for pressure locking between doorjambs and/or opposed walls and/or balustrade uprights, and the like. Such safety gates are usually provided on ends thereof with buffer stops, made of an elastometric substance which when compressed serves to set the safety gate against juvenile displacement between opposed fixed extremes such as one finds in a doorjamb. Usually, ends of extensible-retractable portions of the current safety gate bear opposed flanges which extend outwardly in a U-shaped configuration to engage opposite jambs of a door or related passageway closure. Often these flanges are padded to overcome rattling and to more effectively secure ends of the safety gate. No provision has been made for alternately closure by latching and opening by swinging the safety gate for temporary adult entry and egress.

The present invention overcomes the aforementioned deficiencies and by reason of a construction, which permits facile opening and automatic latching of the gate in closed position. Provision is made herein for releasing a free end of the gate for a hinged swinging motion, to provide temporary passage to an adult. Only one hand is required by the adult to open and close the passageway, a significant option, considering the child-carer's need to hold the toddler when passing from one gated area to another.

THE PRIOR ART

| INVENTOR | DATE | PAT. NO. | TITLE |
| --- | --- | --- | --- |
| Johnson Jr. | Oct. 17, 1995 | 5,457,914 | Safety Gate for Juveniles |

The uniqueness of this invention resides in its functioning as a handily set safety gate having as a primary feature, a selectively latchable and swingable characteristic, permitting intermittent passage for the adult, in addition to its function as a juvenile safety gate.

SUMMARY OF INVENTION

The invention encompasses a juvenile safety gate latch and housing which is handily mobile, its function being to render the existing gate secured, for intermittent passage of an adult through a gateway. It is especially useful as a means of swinging such a gate from its open to closed position, and vice versa. It has specific utility for gates which are extendible and retractable. In their extended, closed position they compress against walls of a passageway for fixation against dislodging forces. The latch housing may be mounted upon a door stop or balustrade separately from the gate, but it is ideally portable with the gate from one passageway to another. It is characterized by its portability and versatile mounting without the use of any screws or other fixing devices. Once mounted it permits the adult to open and close the gate with one hand.

DESCRIPTION OF THE DRAWINGS

FIG. 4 is an enlarged view in side elevation of the tightener rod used to tighten the webbings.

FIG. 5 is an enlarged view in side elevation showing the details of the latch mechanism and anchor therefor.

DESCRIPTION OF PREFERRED EMBODIMENTS

Figure 1:
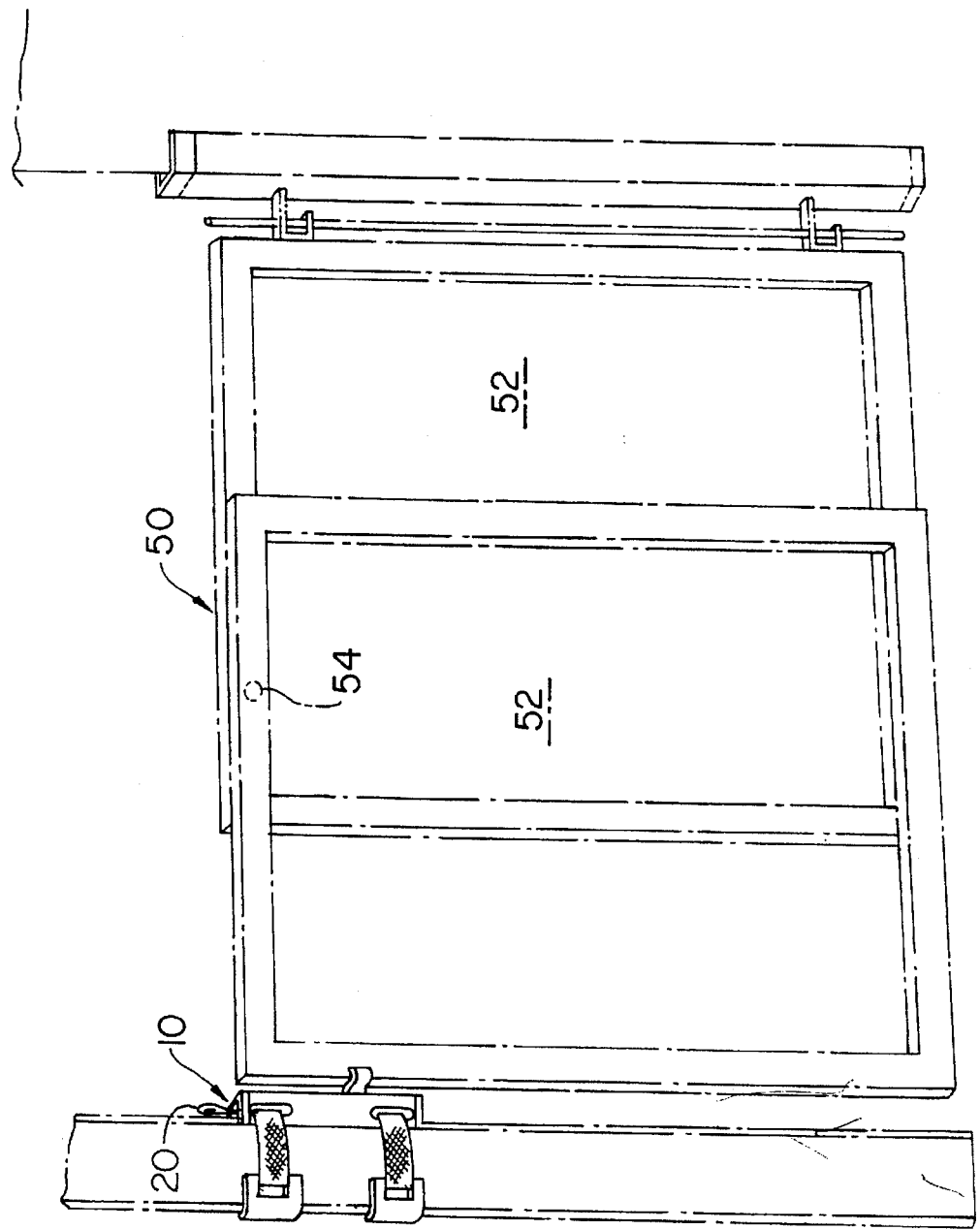
FIG. 1 is a view in perspective of invention showing latching bracket attachment to a fixed moulding of a passageway, the extensible-retractable gate being secured semi-permanently at its opposite hinged end to the opposite fixed portion of the passageway.

The semi-automatic latch and housing receiver for childrens' swing gate is illustrated generally in an activated mode as element 10. See FIG. 1. It comprises a three-sided, open-ended housing which defines a front face 12 having a frontal cutout 14. Opposed wings 16 of the housing define elongated web guides 18 therein.

The automatic release latch 10 secures a plunger 22 therein by means of axially aligned guide tubes, the upper and lower guide tubes 24-24' providing a guide for the lowermost and uppermost segments of the plunger 22. The plunger defines a lifting handle 20 at its upper free end. The uppermost segment of guide tube 24 provides opposed cutouts 25-25' in its uppermost end, the cutouts being adapted to secure projections 23 of the plunger 22 for the reciprocal opening and closing of the U-shaped gate latch 26 as indicated by reference to FIGS. 2 and 5. The latch itself is secured to the portion of the plunger which is adjacent the cutout of the housing by means of set screw 26'. It is accordingly adapted to slideable adjustment, relative to the plunger such that the compression spring 28 of the plunger may be secured operatively with respect to the plunger, per se. See FIG. 5.

Figure 2:
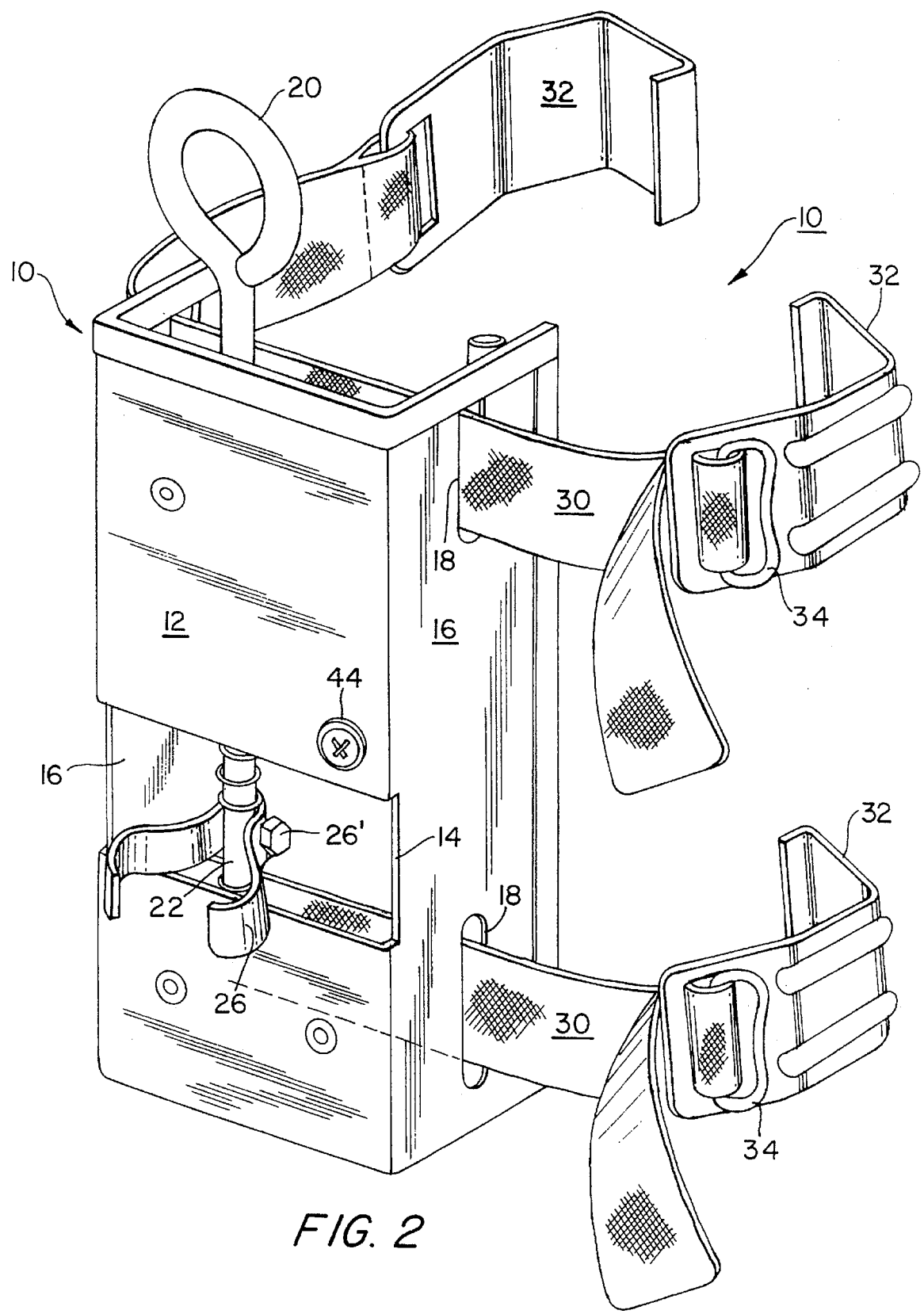
FIG. 2 is a view in frontal perspective of the latch housing and associated latch components.

Referring to FIGS. 2, 4 and 5, webs 30 are terminated on ends by L-shaped clamps 32. Interposed between ends of each such web is a web keeper and buckle 34, permitting by conventional adjustment a lengthening or shortening of the webs 30 relative to the latch housing 10, whereby the housing may be tightened and anchored to its supporting passageway structure, by virture of clamp engagement therewith. See FIG. 1.

Figure 3:
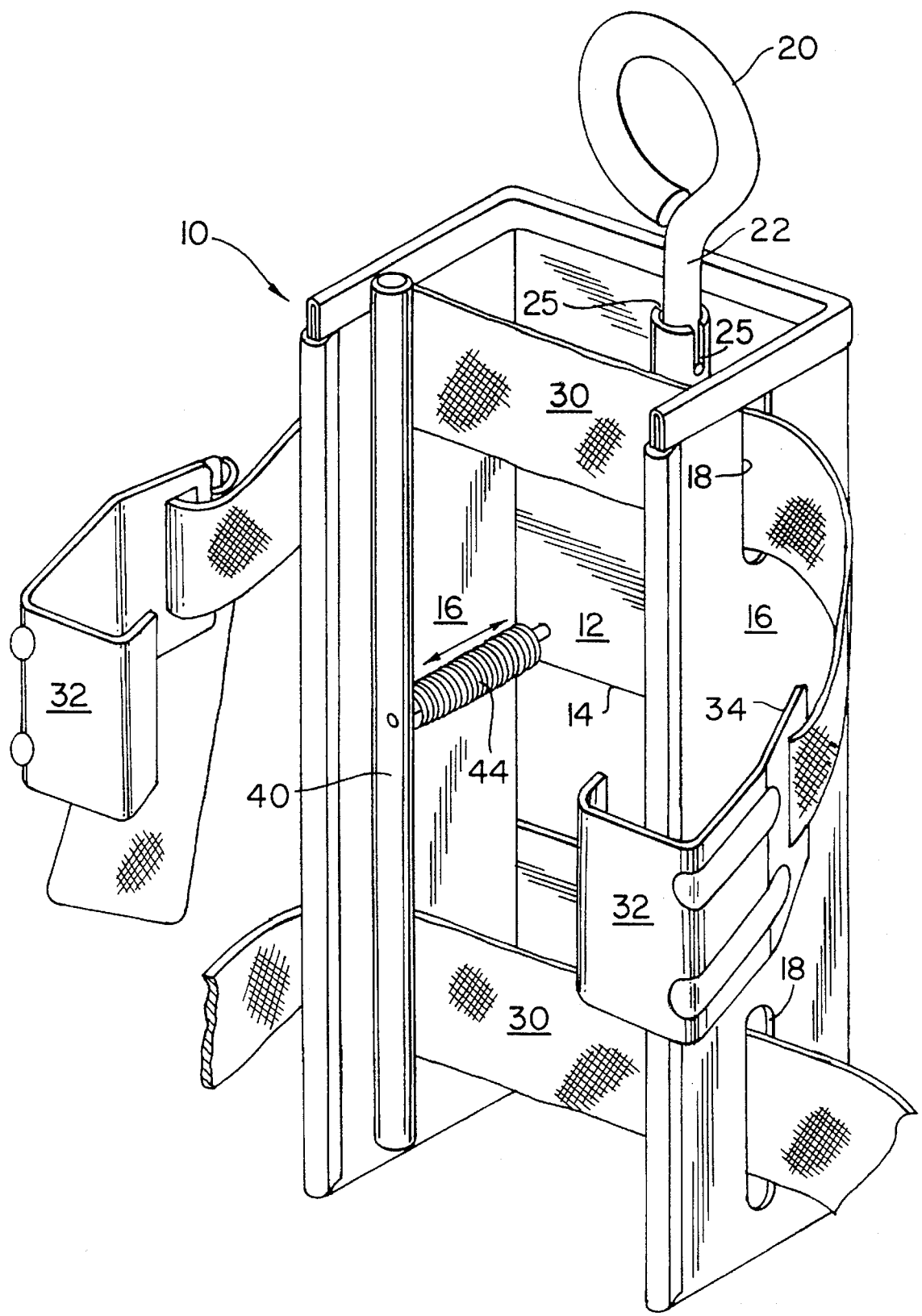
FIG. 3 is a rear prespective of the FIG. 2 latch housing.

A web tightener rod 40 is threaded at intermediate ends 42 thereof for web compression adjustment by means of screw 44 against compression spring 46 application. The adjustment screw and its mount in the surface of the housing 12 is such that the tightener rod 40 may be alternately slack or tension applied to the webs which are engaged by it. See FIGS. 3 and 4.

Swing gate 50 is provided with a suitable hinge bracket mount on its far end where the mount may consist of plural hinge elements or of a bracket containing same. The gate hinge bracket is fixedly mounted in the opposed wall of the passageway as is characteristic of safety gates of this nature, the gates, comprising two panel 52 sections may be adjusted relative to each other by means of the adjustment knob and set screws 54.

OPERATION

In operation, the latch 10 is fixed to such an anchor building element as a doorjamb or balustrade. The clamps 32 of the web 30 engage the building anchor as the webs are retained at slack condition. The user tightens the webs by means of pulling the end of the web through the web keeper buckle 34. Further tightening is effected by screwing the tightener rod 40 against the compression spring 46 and webs.

Gate latch 26 is turned toward the gate 50 when the gate is open, to receive the gate frame as the gate is closed. There is no bar to trip over as with conventional pressure-mounted gates. Upon closure, the release latch plunger 22 is turned by gate latch 26, causing the plunger to reciprocate down the guide tubes, locking plunger and attached latch 26 to set in fully locked position. To again release the latch from the gate, the user simply lifts and turns the release latch 20, setting it into open release relative to the gate.

I intend the above terminology to illustratively describe the invention's preferred embodiment and not to limit the invention's scope. Obviously, many modifications and variations of this invention are possible in light of the above teachings. Within the scope of the appended claims, in which reference numerals are merely for convenience and are not limiting, one may practice the invention other than as the above specification describes.

The scope of invention is thus defined in the following claims, wherein I claim:

1. A latch for a portable passageway safety gate comprising:

a) a vertically extending U-shaped receiver (10) defining a front face (12) and wings (16), said receiver being anchor attachable to a fixed upright of a passageway, said receiver defining on a front face (12) thereof a cutout (14) and at least one pair of vertical guides (18) defined by wings (16) of the receiver;

b) a gate engageable release latch (20), mounted upon a reciprocable plunger (22), the plunger being moveable within at least one guide tube (24) which is fixed to the receiver (10), said tube (24) defining at an upper end thereof at least one plunger latching slot (25), at least one corresponding plunger projection (23) which is engageable with said latching slot (25); compression means (26) urging the plunger downward, and a U-shaped gate engageable latch (26) fixed to the plunger for rotation as in opening and closing the gate;

c) at least one web (30), each said web terminating at free ends thereof in L-shaped clamps (32) and a keeper buckle (34) disposed between respective ends of each said web;

d) a web tightener rod (40) within the receiver, said tightener rod being compression mounted in the receiver (10) by means of a threaded aperture thereon through which an adjustment screw passes to register under a compression spring (46) with the receiver (10).

2. The latch for portable safety gate of claim 1 including vertically aligned guides (18) within opposed wings of the receiver (10) and at least two spaced-apart webs (30) adjustably moveable within the guides (18).

3. The latch for portable safety gate of claim 2 wherein plural webs (30) are mounted in spaced-apart relationship within corresponding vertical guides (18) of wings (16) of the receiver (10).

4. The latch for portable safety gate of claim 3 wherein aligned guide tubes (24)-(24') receive plunger (22) for reciprocation therein.

* * * * *